United States Patent Office 3,322,115
Patented May 30, 1967

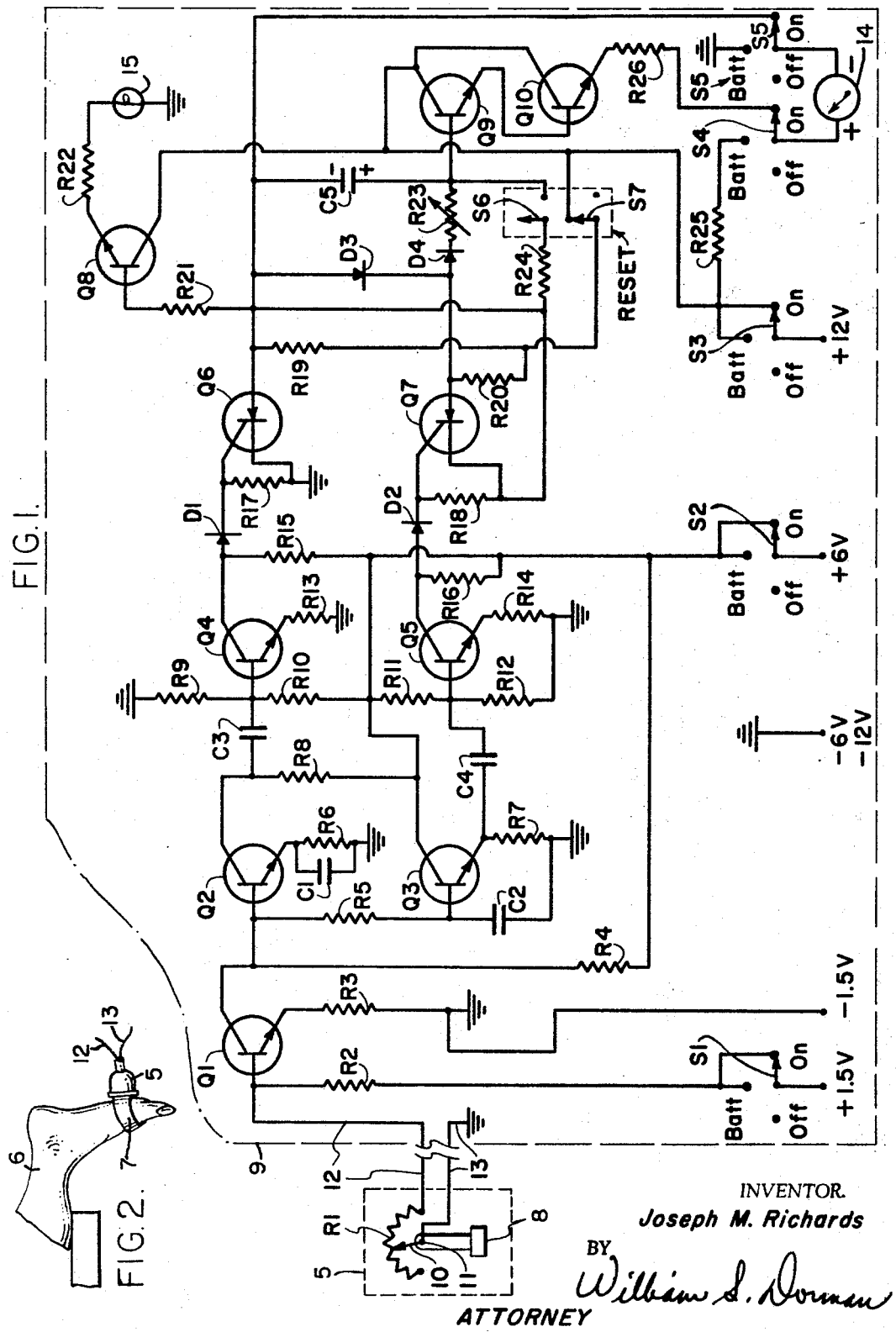

3,322,115
ACHILLES REFLEX TEST APPARATUS
Joseph M. Richards, Tulsa, Okla., assignor to Medco Products Co., Inc., Tulsa, Okla., a corporation of Oklahoma
Filed July 6, 1964, Ser. No. 380,214
6 Claims. (Cl. 128—2)

The present invention relates to an electrical apparatus adapted for us as a diagnostic aid in determining the presence or absence or various malfunctions and diseases. More particularly, and not by way of limitation, the present invention involves an electrical apparatus which is designed to measure the reflex action of the achilles tendon as an aid in the diagnosis of thyroid malfunctions.

The feature of utilizing the reflex action of the achilles tendon as an aid in the diagnosis of thyroid malfunctions and the like is already well known. It has been proposed, for example, to attach a permanent magnet, by taping, to the heel of the patient. A measuring head, having a fixed electrical coil therein, is placed a few inches away from the magnet on the heel. The electrical coil is connected into a standard ECG unit so as to produce a visual trace on the standard ECG chart. Thus, when the achilles tendon is tapped with a reflex hammer, the movement of the magnet with respect to the coil will produce an impulse whose shape will determine the visual trace on the ECG chart.

The present invention provides an apparatus for measuring the achilles reflex in such a manner as to provide a direct reading which is both qualitative and quantitative. The apparatus of the present invention is entirely self-contained and does not require the use of expensive ECG equipment as a means for obtaining the reading or indication desired.

Briefly stated, the apparatus of the present invention includes a sensor, a dual channel amplifier, a timing circuit, and a meter which is actuated by the timing circuit. The sensor includes a rheostat and a pendulum which is connected to the shaft of the rheostat. The sensor is strapped to the foot of the patient. Thus, when the anchilles tendon is struck and the foot moves in accordance with the accompanying reflex action, the rheostat rotates with respect to its shaft so as to provide, first of all, a decrease in the resistance of the rheostat in response to the initial hammer blow and, secondly and thereafter, an increase in resistance as the direction of motion of the foot begins to reverse at the termination of the contraction phase of the reflex. The decrease in resistance in the rheostat provides a pulse through one channel of the dual channel amplifier and through the timing circuit to the meter such that the needle on the meter begins to move outwardly from its initial reference position. When the resistance in the rheostat begins to increase at the termination of the contraction phase of the reflex, a pulse is sent through the other channel of the dual channel amplifier so as to de-energize the timing circuit and stop the motion of the needle on the meter. The meter is calibrated in terms of milliseconds so as to provide a direct and positive reading of the reflex action.

Accordingly, it is a principal object of the present invention to provide a test apparatus of the type described above which is entirely self-contained and which requires no additional apparatus, such as an ECG device, for its operation.

It is a further object of the present invention to provide an apparatus of the type described above which produces a direct and positive reading thereby eliminating interpretative errors.

It is a further object of the present invention to provide an apparatus of the type described above which is relatively simple in construction and operation.

Other and further objects and advantageous features of the present invention will hereinafter more fully appear in connection with a detailed description of the accompanying drawings in which:

FIGURE 1 is a schematic electrical diagram of the circuit employed in the present invention; and FIGURE 2 is a fragmentary view showing the sensor strapped to the foot of a patient.

Referring to the drawing in detail, the sensor is located in a separate housing 5 which can be strapped to the foot 6 of the patient by means of a strap 7 or any other convenient means. Within the housing 5 there is mounted a rheostat having a resistive element R1 and a movable arm 10 keyed on the center shaft 11 of the rheostat. A weighed pendulum 8 is also keyed to the shaft 11. The above arrangement is such that, when the housing 5 is strapped to the foot of a patient, the pendulum 8 tends to hold the shaft 11 and arm 10 in a relatively fixed position, whereas the housing 5 and resistance R1 can move or rotate with respect to the shaft 11, thus providing relative rotary movement between the arm 10 of the rheostat and the resistance member R1 of the rheostat. A lead 12 connects with one end of the resistance R1. A second lead 13 connects with the arm 10. Leads 12 and 13 may be as long as desired; however, these leads are connected at their other ends to the main instrument 9 in which the remainder of the electrical circuitry is housed.

The lead 13 is grounded within the main casing 9. The lead 12 connects with the base of a transistor Q1 which is also located within the main casing 9. All of the remaining elements to be described are mounted in or on the main casing 9.

Three different voltage values are provided in the present test apparatus; that is, voltages of 1.5, 6 and 12 volts. The negative lead of the 1.5 volt source is separately grounded at the bottom of R3. A sufficient number of batteries (not shown) in series provide the 12 volt source. The 6 volt source is taken from the center of the 12 volt source and the negative lead for the 6 volt, 12 volt source is grounded.

Two main switches are provided on the main casing 9. One switch has three different positions designated as "OFF," "BATT" and "ON." This external switch controls five ganged switches designated on the drawing as S1 to S5, inclusive. As shown on the drawing, switches S1 to S5, inclusive, are all in the "ON" position. A second external switch is provided on the main housing 9 and this switch is essentially of the push button type having two ganged switches shown on the drawing as S6 and S7. This switch is designated as "RESET-RECORD" and is provided for a purpose which will appear hereinafter.

The base of Q1 is connected between resistors R1 and R2. The other end of R2 connects with 1.5 volts through switch S1. The emitter is connected through resistor R3 to ground. The collector of Q1 is connected to the base of a transistor Q2 and through resistor R4 and switch S2 to the 6 volt source.

When the achilles tendon is struck with a percussion hammer, the motion of the housing 5 produces a small decrease in the resistance of R1 which causes a corresponding small decrease in the positive bias on the base of Q1. This decrease in positive bias causes the voltage at the collector of Q1 to rise to higher positive value.

Transistor Q2 has its base connected to the collector of Q1 as indicated heretofore. The base of Q2 also connects with the base of transistor Q3 through resistor R5. The emitter of Q2 connects to ground through resistor R6, and capacitor C1 in parallel. The collector of Q2 connects with the 6 volt source through resistor R8 and switch S2. When the collector of Q1 rises to a higher positive value, Q2 becomes highly conductive so as to cause the voltage at its collector to fall to a very low value.

The collector of Q2 is coupled to the base of transistor Q4 by means of condenser C3. Q4 is normally biased to a heavily conducting condition. The base of Q4 connects between resistors R9 and R10. R9 is grounded at its opposite end, whereas the other end of R10 connects to the 6 volt source through switch S2. The emitter of Q4 connects through resistor R13. The collector of Q4 connects with the 6 volt source through resistor R15 and switch S2. When Q4 is at its normally heavily conducting condition, the voltage at the collector of Q4 is below the conductance threshold of a diode D1 which is connected to the collector of Q4. However, when the voltage at the collector of Q2 falls as a result of the hammer blow, the base bias of Q4 is correspondingly reduced and Q4 is cut off, resulting in the voltage at the collector of Q4 rising to a value above the conduction threshold of diode D.

The diode D1 is connected in the gate circuit of a silicon control rectifier Q6 which is the solid state equivalent of a thyratron. The anode of Q6 is connected to the 12 volt source through resistor R19, switch S7 and switch S3. The gate of Q6 connects with D1, as previously mentioned, and one side of resistor R17. The other side of resistor R17 is connected to ground in common with the cathode of Q6. When the voltage at the collector of Q4 rises as a result of the hammer blow, as described above, current flows through D1 and the gate of Q6 becomes positive, thereby causing Q6 to fire and reducing the anode potential of Q6 from about 12 volts to essentially ground potential. This action will cause a capacitor C5 to charge in the folowing manner:

A second control rectifier Q7 is located in the circuit such that its cathode is connected directly to the anode of Q6. The gate of Q7 is connected to its cathode through resistor R18. The anode of Q7 connects with the 12 volt source through resistor R20 and switches S7 and S3. The anode of Q7 also connects with the other side of C5 through diode D4 and variable resistor R23. A zener diode D3 is connected across the anodes of Q6 and Q7 so as to serve as a voltage regulator to provide a constant potential for the charging of C5. Since Q7 is normally nonconducting, the voltage at its anode will be substantially 12 volts. When Q6 is also nonconducting, there will be no voltage across the capacitor C5; however, when the voltage at the anode of Q6 drops to substantially ground potential as a result of the hammer blow a positive voltage is impressed (from bottom to top) across the condenser C5. As a result of the zener diode D3, this positive voltage is maintained at a constant value of 9.1 volts. Thus, the capacitor C5 begins to charge through diode D4 and resistor R23. It might also be mentioned that the reduction of voltage at the anode of Q6 will result in bringing the potential at the gate and cathode of Q6 substantially to ground potential such that Q7 is now ready for firing.

C5 continues to charge until Q7 is fired, as will be explained hereinafter. When Q7 fires, however, its anode assumes nearly ground potential so that current ceases to flow through D4 and R23. On the other hand, D4 prevents the discharge of capacitor C5 back through the two anode resistors R19 and R20. Therefore, the only discharve path for the capacitor is through the base of a transistor Q9 as will be described below.

One side (the negative side) of C5 is connected to a meter 14 through switch S5. The lower (positive) side of C5 is connected to the base of a transistor Q9. Transistor Q9 and transistor Q10 are connected as a cascade emitter-follower pair between C5 and the opposite side of the meter 14 through resistor R26 and switch S4. The collectors of Q9 and Q10 are connected in common to the 12 volt source through the switch S3. The emitter of Q9 is connected directly to the base of Q10. Thus, when the potential at the anode of Q6 falls to zero, the subsequent charging of the capacitor C5 will place a positive bias on the base of Q9 causing Q9 and Q10 to conduct through R26 and the meter 14. The reading on the meter 14 will be proportional to the ultimate charge on the capacitor C5.

At the end of the contraction phase of the achilles reflex action, the resistance of R1 begins to increase. The increase in resistance of R1 provides an increase in positive bias on the base of Q1 thereby causing a decrease in the collector voltage of Q1. The collector of Q1 is connected to the base of Q3 through resistor R5. The base of Q3 connects through R5, R4 and the switch S2 to the 6 volt source. The base of Q3 is also connected through capacitor C2 to ground. The resistor R5 and capacitor C2 constitute an RC filter, the purpose of which is to remove spurious signals which might prematurely trigger Q7. At any event, the decrease in the collector voltage of Q1 will create a decrease in the base voltage of Q3 causing a corresponding decrease in the emitter voltage of Q3.

The emitter of transistor Q3 is connected to the base of a transistor Q5 by means of a condenser C4. The transistor Q5 is normally biased to a heavily conducting condition. That is, the base of transistor Q5 is connected between resistors R11 and R12. R12 is connected at its other end to ground and R11 is connected at its other end to the 6 volt source through switch S2. The emitter of Q5 is connected to ground through resistance R14. The collector is connected to the 6 volt source through resistance R16 and switch S2. The collector of transistor Q5 is also connected to a diode D2 in a manner later to be described.

As previously stated, the resistance of R1 begins to increase at the end of the contraction phase of the achilles reflex and this ultimately will cause a decrease in the emitter voltage of Q3; the base bias of Q5 is correspondingly reduced and Q5 is cut off resulting in an increase in voltage at the collector of Q5.

Diode D2 and control rectifier Q7 are connected in similar fashion to diode D1 and control rectifier Q6 previously described. When Q5 is normally conducting the voltage at the collector is below the conductance threshold of diode D2. However, when the voltage at the collector of Q5 rises as a result of Q5 being cut off, this voltage exceeds the conduction threshold of D2 and D2 commences to conduct. Immediately thereafter, the gate of Q7 becomes positive and Q7 fires. When Q7 conducts, the anode potential of Q7 falls from its former value of 9.1 volts to essentially ground potential thus terminating the charging of C5.

At this point, it should be mentioned that both Q6 and Q7 are conducting and that they will continue to conduct until the anode supply voltage is interrupted. For the latter reason, the reset control consisting of switches S6 and S7 is provided. After the meter 14 has been read, the reset-record button is depressed so as to move the switches S6 and S7 clockwise approximately ninety degrees. When the switch S6 has moved to the reset position, as indicated above, resistor R24 is placed across the capacitor C5 causing the latter to discharge and at the same time returning the meter 14 to its initial reference position. When S7 is moved to the reset position, as indicated above, the voltage source through switch S3 is interrupted to the anodes of Q6 and Q7 so as to cut off Q6 and Q7.

When the operator removes pressure from the reset-record button, the 12 volt potential will be returned to the anodes of Q6 and Q7. At the same time, 12 volt potential will be applied to the base of a transistor Q8 through a resistor R21. The collector of transistor Q8 is connected to the 12 volt source through the switch S3. The emitter of Q8 connects to ground through a resistance R22 and a 2 volt indicator light 15. Thus, when the reset button has been depressed and released, the voltage at the base of Q8 is sufficient to cause Q8 to conduct so that the light 15 will glow indicating that the circuit is ready to operate. On the other hand, when Q6 has been fired, the voltage at the base of Q8 falls to essentially ground potential and the light 15 goes out indicating that the circuit has been fired.

When switches S1 to S5, inclusive, are turned to the "OFF" position, no voltages are applied to any part of the circuit. In the intermediate or "BATT" position the instrument is turned on but the meter 14 is connected to the 12 volt source through resistor R25. A line (not shown) will be provided on the dial on the meter face to designate the condition of the battery; when the switches are placed in the "BATT" position, if the needle is below the designated line, the battery must be replaced because the zener diode D3 will no longer control the voltage which charges capacitor C5.

Transistors Q9 and Q10 are connected, as indicated heretofore, as a cascade emitter-follower between the capacitor C5 and the meter 14. These transistors Q9 and Q10 together with resistor R26 present a very high resistance to C5, thus producing a very long time constant for the discharge of C5. Therefore, the meter reading obtained from the charge on C5 will be held for several seconds, thereby permitting the charge on the condenser to be read in terms of the milliseconds of time that have elapsed between the firing of Q6 and Q7. The voltage to which C5 is charged is a function of time such that the greater the elapsed time between the firing of Q6 and Q7, the greater will be the charge of C5. As indicated heretofore, the charge on C5 is dissipated and the meter is returned to its initial reference position when the reset button has been pushed; placing the resistance R24 across the capacitor C5 by means of the switch S6 will provide this discharge and the return of the meter to the desired starting position.

Whereas the present invention has been described in particular relation to the circuit disclosed herein, it should be understood that other and further modifications, apart from those shown or suggested herein, may be made within the spirit and scope of this invention. For example, the silicon control rectifiers, Q6 and Q7, could be replaced by flip-flop circuits, respectively, which also have the capability of retaining a given conducting state after triggering and which, in addition, are capable of being reset to an opposite or non-conducing state by means similar to that previously described herein. Obviously, the transistors and diodes could be replaced by equivalent vacuum tubes, and the switches need not necessarily be of the specific types described herein. Furthermore, although the transducer (in the sensor) has been described herein as being of a resistive type, any other electro-mechanical device capable of operating in an equivalent manner could be employed in the present invention.

What is claimed is:

1. Apparatus for measuring a reflex action comprising a sensor adapted for engagement with that portion of a patient's body where the reflex action occurs, said sensor having means therein for producing an electrical pulse during the reflex action, a timing circuit, a meter which is actuated by the timing circuit and having an indicating means therein movable from an initial reference position to another position commensurate with the value of a voltage placed upon said meter by said timing circuit, means for conducting a pulse from said sensor to said timing circuit for initiating a continuously increasing charge in said timing circuit in response to the beginning of said pulse from said sensor thereby producing said voltage, and means for interrupting the charging of said timing circuit at the end of said pulse.

2. Apparatus for measuring a reflex action comprising a sensor adapted for engagement with that portion of a patient's body where the reflex action occurs, said sensor having means therein for producing an electrical pulse during the reflex action, a dual channel amplifier, a timing circuit connected with the dual channel amplifier, a meter which is actuated by the timing circuit and having an indicating means therein movable from an initial reference position to another position commensurate with the value of a voltage placed upon said meter by said timing circuit, means for conducting a pulse from said sensor to the two channels of the dual channel amplifier, one channel of said dual channel amplifier initiating a continuously increasing charge in said timing circuit in response to the beginning of said pulse from said sensor thereby producing said voltage, the second channel of said dual channel amplifier interrupting the charging of said timing circuit by said first channel of said dual channel amplifier at the end of said pulse.

3. Apparatus for measuring the duration of a pulse comprising a meter having an indicating means movable thereon from an initial reference position to a second position spaced from said reference position by an amount commensurate with the value of a voltage impressed across said meter, a capacitor and a high resistance in series connected across the terminals of said meter, means for placing a D.C. potential of a given magnitude on one side of said capacitor, a unidirectional charging means, means for placing a D.C. potential of said given magnitude on the other side of said capacitor through said unidirectional charging means, voltage limiting means connected across said capacitor, means responsive to the iniation of a pulse for reducing the D.C. potential on said one side of said capacitor to substantially ground potential whereby said capacitor commences to charge through said unidirectional charging means, and means responsive to the end of said pulse for reducing the D.C. potential applied to the other side of said capacitor through said unidirectional charging means to substantially ground potential whereby the charging of said capacitor is terminated.

4. Apparatus as set forth in claim 3 including reset means comprising means for dissipating the charge on said capacitor and for thereafter placing said D.C. potential of said given magnitude on both sides of said capacitor.

5. Apparatus as set forth in claim 3 including indicating means for indicating when the D.C. potential of said given magnitude is impressed upon said one side of said capacitor.

6. Apparatus for measuring the reflex action of the achilles tendon comprising a meter having an indicating means thereon movable from an initial reference position on the meter to a second position away from said reference position by an amount commensurate with the electrical charge imposed upon said meter; a first capacitor having a discharge path through said meter in series with a long time constant; said long time constant including a pair of transistors connected between one side of said first capacitor in series with each other as a cascade emitter-follower pair and with one side of a first resistance whose other side is connected to one side of said meter, the other side of said first capacitor being connected to the other side of said meter; a first control rectifier having an anode, a cathode, and a gate; the anode of said first control rectifier being connected to the other side of said first capacitor and through a second resistance to a positive D.C. potential; a third transistor having a base, a collector and an emitter; said collector of said third transistor being connected through a third resistance to a positive D.C. potential; a first diode connected between the collector of said third transistor and the gate of said first control rectifier; said third transistor being normally heavily conducting such that the output voltage at its collector is below the conductance threshold of said first diode; a fourth transistor having a base, a collector and an emitter; said collector of said fourth transistor being connected through a fourth resistance to a positive D.C. potential; a second capacitor connecting the collector of said fourth transistor with the base of said third transistor; a fifth transistor having a base, a collector and an emitter; the collector of said fifth transistor being connected through a fifth resistance to a positive D.C. potential; a second control rectifier having an anode, a cathode and a gate, said anode of said second control rectifier being connected through a sixth resistance to a positive D.C. potential; a zener diode connected across the anodes of said first and second control rectifiers to prevent the positive potential at the anode of said second control rectifier from exceeding a predetermined value with respect to the anode of said first control rectifier; a third diode and a seventh resistance connected in series with each other and between the anode of said second control rectifier and said one side of said first capacitor; means connecting the anode of said first control rectifier with the cathode of said second control rectifier; a sixth transistor having a base, a collector and an emitter; the collector of said sixth transistor being connected through an eighth resistance to a positive D.C. potential; a fourth diode connected between the collector of said sixth transistor and the gate of said second control rectifier; said sixth transistor being normally heavily conducting such that the output voltage at its collector is below the conductance threshold of said fourth diode; a seventh transistor having a base, a collector and an emitter; the collector of said seventh transistor being connected through a ninth resistance to ground; a third capacitor connected between the emitter of said seventh transistor and the base of said sixth transistor, the base of said seventh transistor being connected through a tenth resistance to the base of said fourth transistor, a sensor adapted to be connected to the foot of a patient, said sensor having a variable resistance therein, one side of said variable resistance being connected to the base of said fifth transistor and the other side of said variable resistance being connected to ground, the mounting of said variable resistance in said sensor being such that the resistance thereof is decreased as a result of the movement of said sensor when the achilles tendon of the patient is first struck with a percussion hammer or the like, the value of the resistance of the variable resistance thereafter increasing at the end of the contraction phase of the achilles reflex action, means supplying a small positive bias to the base of said fifth transistor, whereby, when said achilles tendon is struck with a percussion hammer, the value of the variable resistance in the sensor decreases so as to decrease the positive bias on the base of said fifth transistor thereby increasing the voltage at the collector of said fifth transistor and at the base of said fourth transistor and thereby causing a resultant drop of voltage at the collector of said fourth transistor and the base of said third transistor, cutting off the conduction of said third transistor and raising the value of the voltage at the collector of said third transistor above the conduction threshold of said first diode so as to fire said first control rectifier and initiate the charging of said first capacitor, the indicating means on said meter thereby moving from its intial reference position an amount commensurate with the charge placed upon the said first capacitor, and whereby at the end of the contraction phase of the achilles reflex action, the value of the resistance in the variable resistance in said sensor begins to increase, the positive bias on the base of said fifth transistor increases, thereby decreasing the voltage at the collector of said fifth transistor and at the base of said seventh transistor so as to decrease the voltage at the emitter of said seventh transistor and the base of said sixth transistor, cutting off said sixth transistor such that the voltage at its collector rises above the conduction threshold of said fourth diode firing said second control rectifier so as to stop the charging of the first capacitor.

References Cited
UNITED STATES PATENTS

| | | | |
|---|---|---|---|
| 2,111,135 | 3/1938 | Bagno | 128—2.1 |
| 2,301,192 | 11/1942 | Bradford | 324—68 |
| 2,619,956 | 12/1952 | Torricelli | 128—2 |
| 2,716,978 | 9/1955 | Torricelli | 128—2 |
| 2,744,520 | 5/1956 | Torricelli | 128—2 |
| 3,051,896 | 8/1962 | Bieganski | 324—71 |
| 3,200,814 | 8/1965 | Taylor et al. | 128—2 |

RICHARD A. GAUDET, *Primary Examiner.*

S. BRODER, *Assistant Examiner.*